Figure 1:
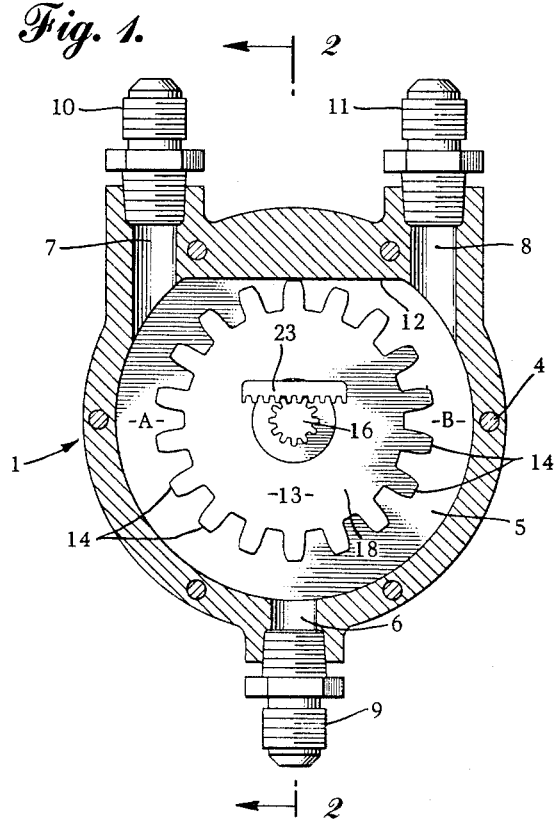

June 30, 1964 H. F. LOVE 3,139,104
FLOW CONTROLLING DEVICE
Filed Nov. 20, 1961 3 Sheets-Sheet 1

Inventor
HERMAN F. LOVE
by Richard F. Carr
Attorney

Inventor
HERMAN F. LOVE
Attorney

United States Patent Office 3,139,104
Patented June 30, 1964

3,139,104
FLOW CONTROLLING DEVICE
Herman F. Love, 825½ Laveta Terrace,
Los Angeles 26, Calif.
Filed Nov. 20, 1961, Ser. No. 153,433
16 Claims. (Cl. 137—98)

This invention pertains to a device for controlling fluid flow which may be used to divide a single stream into two equal divisions, or control two merging flows so that the incoming streams are equalized.

There have been in the past many proposals for fluid flow equalizing or dividing devices. There are considerable uses for a unit that will separate a single stream into separate equal streams, or to equalize two flows that are emptied into a common line. One suggested design has included a pivotal vane located within a fluid passageway, to be reacted against by the forces of the fluid and assume a position to divide fluid flow. This, however, has proven to be highly inaccurate flow equalizing arrangement. Other designs have been somewhat more involved, including a multiplicity of moving parts such as differential pressure pistons and the like. Despite the cost, complexity and weight of such units, however, results have been far from satisfactory. Furthermore, it has been impossible in prior designs to provide a unit that will equalize flows either on the input or the outlet side of the unit.

The present invention overcomes these and other difficulties in the prior art through the provision of a housing containing a disc-like element preferably having outwardly projecting vane elements. The housing has a single opening on one side of the disc member, while two openings are located on the opposite side. The flow either can enter the single aperture to pass out of the housing in equal streams through the other two openings, or the one opening can act as the outlet. In the latter event, the incoming flows are made identical. A small gear is carried by the disc and engages a rack fixed to the housing. The rack defines a path of movement across the housing in which the disc element moves in response to fluid flow through the housing. The fluid forces passing through the housing cause the disc to position itself precisely so that the flows are equalized. The location of the rack with respect to the openings in the housing is reversible and determines when the device will operate as an equalizer or a divider.

Therefore, it is an object of this invention to provide a flow equalizing or dividing device of extreme accuracy.

Another object of this invention is to provide a unit of simple and low cost construction yet of superior performance either as a flow equalizer or divider.

A further object of this invention is to provide a device that can function either as an equalizer or divider depending on the manner in which it is assembled, but without the use of any different parts.

An additional object of this invention is to provide a flow equalizer or divider that is operable in any attitude (i.e., is not adversely affected by gravity forces).

Figure 2:
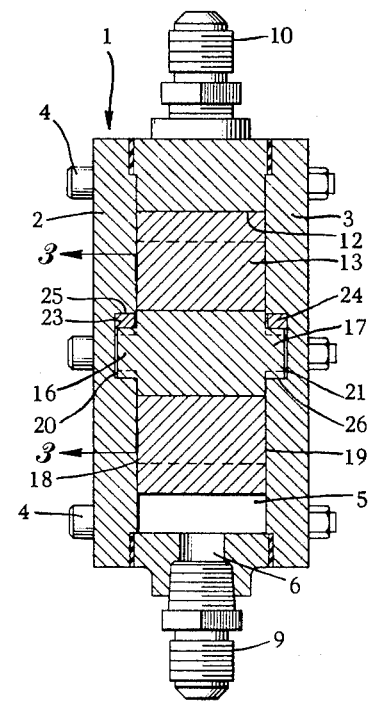
Figure 3:
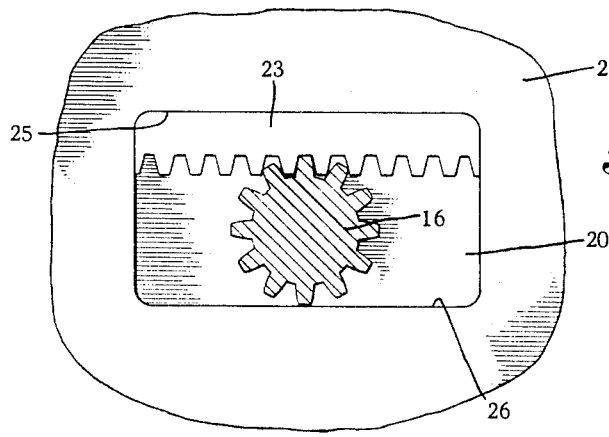
Figure 6:
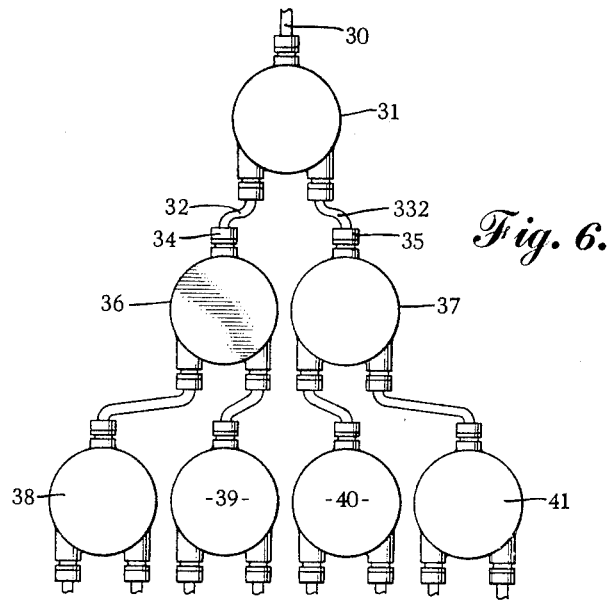
Figure 4:
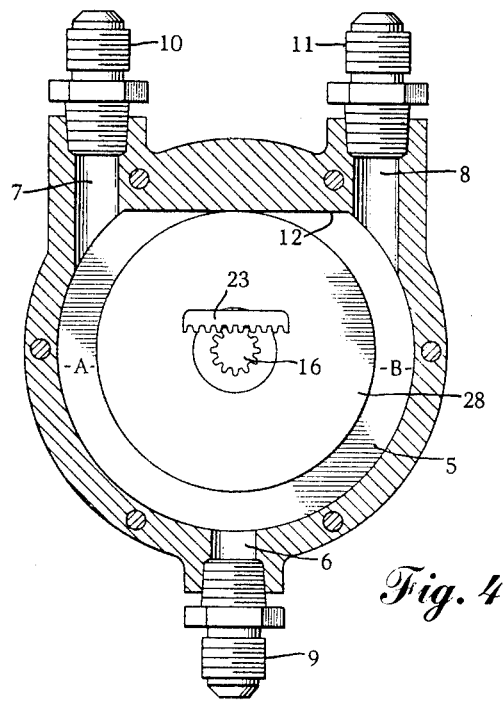
Figure 5:
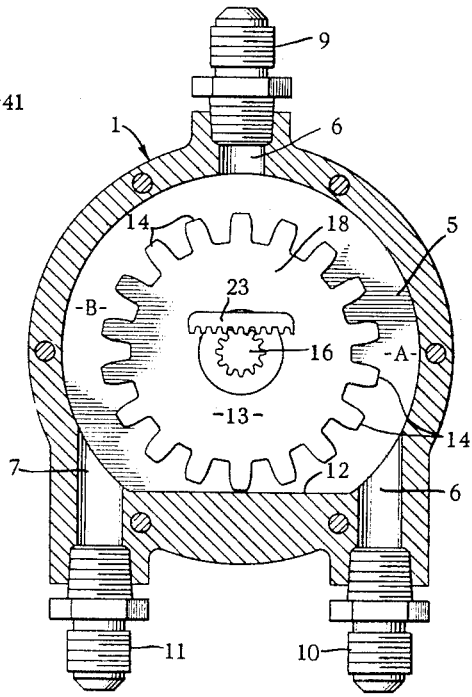
Figure 7:
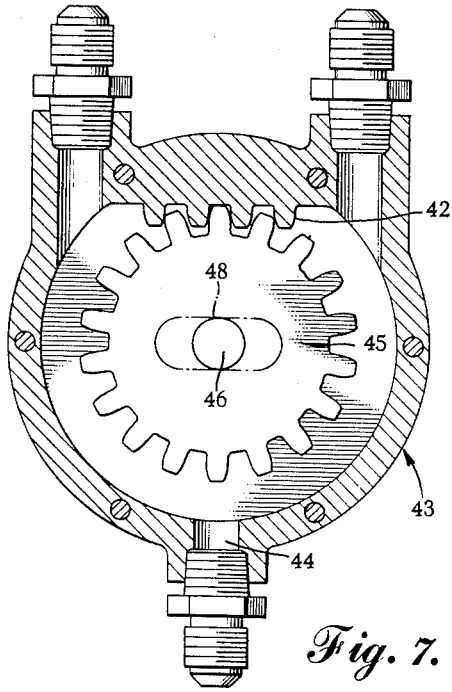
Figure 8:
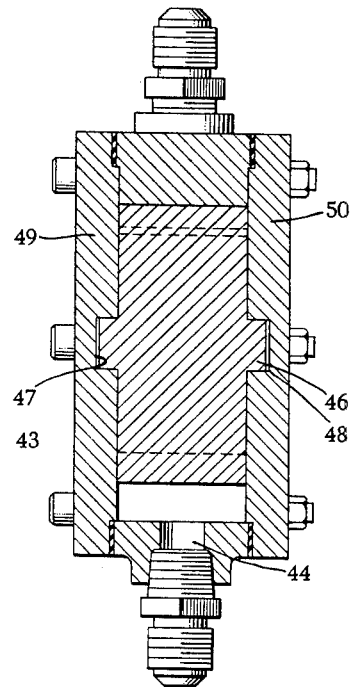
Figure 9:
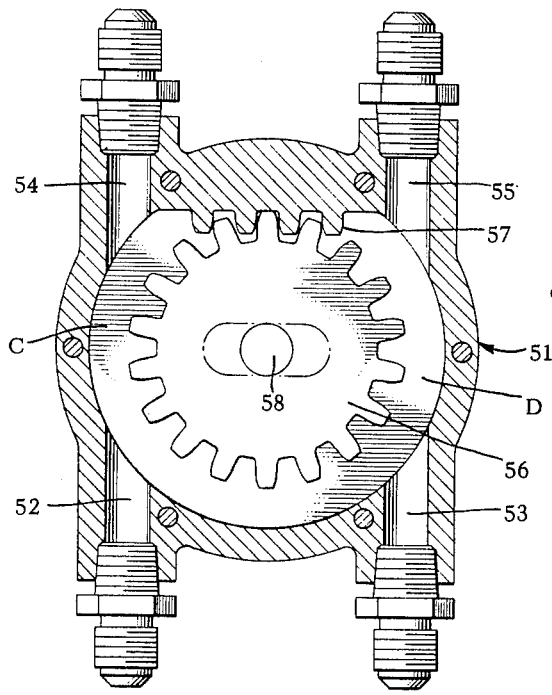

These and other objects will become apparent from the following detailed description taken in connection with the accompanying drawing in which:

FIG. 1 is a longitudinal sectional view of this invention illustrating the arrangement of the internal movable disc and its guiding mechanism, as well as the inlet and outlets for the housing, FIG. 2 is a sectional view taken along line 2—2 of FIG. 1, FIG. 3 is an enlarged fragmentary sectional view taken along line 3—3 of FIG. 2 showing how the rack and pinion are arranged with respect to the housing, FIG. 4 is a sectional view similar to FIG. 1 showing the use of a disc element having no projecting vanes, FIG. 5 is a sectional view similar to FIG. 1 showing the invention as assembled for use as a flow equalizer, FIG. 6 is a top plan view illustrating the manner in which the units of this invention may be connected together to provide a plurality of equal flow, FIG. 7 is a sectional view similar to FIG. 1 illustrating a modified form of the invention in which the flow dividing member meshes with a rack on the wall of the chamber, FIG. 8 is a sectional view taken along line 8—8 of FIG. 7, and FIG. 9 is an illustration of a further modification of the invention in which the housing is provided with four openings for transmitting fluid.

With reference to the drawing, the invention as utilized as a flow divider may be seen in FIGS. 1, 2 and 3. Included is a suitable housing 1 provided with parallel cover plates 2 and 3 held in place by a plurality of bolts 4. The interior of the housing includes a symmetrical chamber 5 having a single opening 6 through the housing wall at one end, and a duality of openings 7 and 8 at the opposite end. Suitable fittings 9, 10 and 11 may be threaded into the openings for connection to appropriate fluid lines. The housing wall includes a straight segment 12 at the end opposite opening 6, interposed between the two apertures 7 and 8. This portion of the housing wall is substantially perpendicular to an extension of the axis of aperture 6. Such an extension would bisect the housing.

Disposed within the chamber 4 of the housing 1 is a disc member 13. Preferably, this element is provided with a plurality of outwardly projecting vanes 14, and in one embodiment may resemble a gear. The outer edge of one side of the disc member 13 is in juxtaposition with the straight wall 12. While the vane, or vanes, at that position should be close to the wall 12, contact with the wall is not necessary. It can be seen, therefore, that effectively the disc member 13 divides the chamber 5 into a duality of passageways A and B on the left and right hand sides of the disc, respectively, interconnecting opening 6 with both the aperture 7 and the aperture 8.

Carried by the disc 13 at its axis are two small gears 16 and 17 aligned with the radial faces 18 and 19 of the disc. These small gears are secured to the disc so that in effect they are integral therewith. The gears project into recesses 20 and 21 formed in the mover plates 2 and 3, respectively. Within these recesses are located racks 23 and 24 which mesh with gears 16 and 17, respectively. The recesses are substantially rectangular in form and in the embodiment of FIGS. 1, 2 and 3, the flat side of each rack opposite the teeth engages one of the flat elongated walls of the recess. Thus the rack 23, as seen in enlarged view of FIG. 3, contacts side wall 25 of the recess 20. The rack and recess are so dimensioned that the other side of the gear is adjacent the opposite wall 26 of the recess. In this manner, the gear is retained by the wall 26 of the recess and by the rack, and is rotatable relative to the rack. The side 25 of the recess, and hence the pitch line of the teeth of the rack 23, is parallel to the flat wall section 12 of the housing opposite the opening 6.

It is apparent, therefore, that the disc 13 is retained in the housing by the gears 16 and 17 which engage the recess walls and the teeth of the racks. This permits the disc 13 to rotate, whereupon it will shift transversely within the housing along a line parallel to the teeth of the rack. Hence, the axis of the disc is floating, and the disc can move in a predetermined limited straight line path normal to the axis of the opening 6.

As a result of this construction, fluid can be admitted into the housing through a line connected to fitting 9 so as to enter the chamber 5 through opening 6. The fluid will encounter the disc 13 which causes it to divide and flow through passageways A and B to the outlets 7 and 8. This fluid will follow the paths of least resistance between the inlets and outlets, and will not tend to flow through any clearance existing between the periphery of the disc and wall 12. Precision fitting, therefore, is unnecessary.

As the fluid passes by the disc 13, it impinges upon the vanes 14 in the fluid path. It is obvious that the flow in passageway A imposes a clockwise moment on the disc 13, while a counterclockwise torque is generated by the fluid in passageway B. Therefore, if the flow through passageways A and B are equal, the moments will cancel each other and the disc 13 will remain motionless.

In the event that the flow should increase through one passageway with respect to the other, however, the disc 13 instantaneously will be set in motion. For example, if a greater quantity of fluid should flow through passage A than is found in passage B, there would be more force imposed upon the vanes 14 in the former passage than in the latter. As a result, the moments upon the gear no longer will be in balance. The clockwise moment from the fluid in passage A will be slightly greater than the counterclockwise torque caused by the fluid contacting the vanes 14 in passage B. Therefore, the disc 13 will be caused to rotate in a clockwise direction.

When this occurs, the gears 16 and 17 will rotate relative to the racks 23 and 24. The gears must follow the racks so that as the disc 13 rotates clockwise, the racks and gears cause it to move laterally to the left. This movement to the left shifts the disc closer to the lefthand wall of the chamber 5, thereby cutting down on the cross sectional area of the passage A while increasing that of passage B. The result of this is a decreased flow in passage A, and an increased flow in passage B. The disc rotation occurs until the moments again cancel themselves out, signifying equal flow through the passageways A and B.

Thus, through the provision for the lateral linear movement of the disc, an automatic stabilization is achieved and the flows through the two passageways must always be identical. Therefore, the fluid passing through the outlets 7 and 8 is the same in each such passage, and two perfectly divided flow streams are produced. An extremely accurate equalizing effect is achieved in this manner, and the unbalanced fluid itself causes the necessary movement of the equalizing disc. As a result, there is virtually no time relay in the reaction of the disc so that balancing forces operate immediately and always maintain the constant flow conditions in the openings 7 and 8.

The disc 13 is contained by the housing walls 2 and 3, and receives relatively large inward radial forces from the fluid stream. Therefore, it will always operate satisfactorily regardless of the attitude of the housing, being suspended by the fluid passing through the housing. This means that the device of this invention may be located in and airplane, a ship, or other vehicle, and will operate despite gravitational forces that may be encountered.

Of course, the materials used and the size selected for the unit will depend upon the particular condition encountered. Density, viscosity and flow velocity are matters to be taken into account. Relatively light materials may be selected for controlling gaseous flow, while in all instances compatability with the fluid will be a factor. The device will operate equally well in controlling the flow of various liquids or gases.

If desired, the invention may be constructed as seen in FIG. 4 where it is identical to the version of FIG. 1 with the exception that the equalizing disc 28 is not provided with projecting vanes as was the case for disc 13. The smooth-sided disc 28, therefore, will not impose any particular frictional loss on the fluid passing through the housing nor cause the flow to become excessively turbulent. Movement of the disc 28, however, will depend upon the frictional forces imposed upon the sides of the disc, which will be somewhat lower than the forces engendered by the projecting vanes. The practicality of the unit of FIG. 4, therefore, depends to some extent upon the particular situation involved, such as the pressure and velocity of the fluid as well as its viscosity. It will operate more advantageously with a relatively viscous liquid than for a gas.

The unit of this invention operates with as much facility as a flow equalizer (see in FIG. 5) as it does as a flow divider as in the previously described embodiments. It is not necessary to employ any new or different parts in utilizing the device as an equalizer. The only difference occurs in the manner in which the device is assembled.

Instead of locating the racks so that they are adjacent flat wall 12 of the housing, their positions are reversed 180°. This is accomplished easily by simply rotating the cover plates 2 and 3 through 180°. This locates the side 25 of recess 20 adjacent the opening 5, and on the side of gear 16 opposite from the straight wall section 12. A similar effect is obtained for the sides of recess 21. Therefore, the racks 23 and 24 likewise are located on the sides of their gears that are closest to the aperture 6. Naturally, the openings in housing 1 for the bolts 4 must be spaced appropriately to allow this reversal of plates 2 and 3.

For this arrangement of the invention, the openings 7 and 8 become the inlets for the unit, while the aperture 6 serves as the outlet. Two different fluid streams, which may have considerably different pressure heads, can be connected to the openings 7 and 8. The fluid passing from aperture 7 into the passageway A, therefore, imposes a counterclockwise moment on the disc in the unit as illustrated in FIG. 5. Similarly, the fluid from inlet 8 in the chamber portion B tends to rotate the disc in the clockwise direction. If a greater flow were to be encountered in passageway B, for example, the clockwise moment would exceed the counterclockwise moment, thereby causing the disc to rotate in the former direction. Engagement of the gears 16 and 17 with the racks 23 and 24 would thereupon cause the disc to move to the left, cutting down the size of passageway B. As a result, passageway A would be opened up while passageway B was throttled, permitting the disc to move only until the pressures were equalized on both sides of it. Therefore, the equalizing disc 13 or 28 will assure that flow through lines 7 and 8 is identical, regardless of the pressure heads in these two lines.

Thus by a simple change in the position of the racks from one side of the gears to the other, the device operates to equalize two incoming fluid streams as accurately as it divided the flow in the previously described embodiment.

The device of this invention is particularly versatile and is not limited to merely the production of two equal incoming or outlet flows. The units may be combined in the manner illustrated in FIG. 6 so that any desired number of equal flows may be obtained. As seen in that figure, a single line 30 connects with a first unit 31, while a pair of conduits 32 and 33 extends from the unit 31 to the single openings 34 and 35 or the pair of flow equalizing devices 36 and 37. These are similarly connected to additional units 38, 39, 40 and 41. The latter devices have eight connections on the opposite end of the complex thus provided. Therefore, if the units are assembled as flow dividers, the unit 31 will produce two equal streams in the lines 32 and 33. These in turn will be equally divided by the units 36 and 37 causing four equal streams to enter the units 38, 39, 40 and 41. The eight outlet lines, consequently, will all have equal flows therein.

Alternatively, if the device is acting as a flow equalizer, eight inlet lines may be connected to the units 38, 39, 40 and 41. These fluid streams, reacting through the additional units 36, 37 and 31, will cause the flows all to be equal in the eight lines. Thus almost any variation of equal fluid flows may be accomplished through the provisions of this invention.

For simplification the device of this invention may be constructed as shown in FIGS. 7 and 8 where the separate gears 16 and 17, and racks 23 and 24 are omitted. Instead, a rack 42 is formed on the straight wall of the housing 43 opposite single inlet aperture 44. The disc member 45 is formed as a gear meshing with the rack 42. An axial pin 46 extends through the gear 45, preferably projecting in both directions so that its ends are received in slots 47 and 48 in the cover plates 49 and 50. The slots are parallel to the pitch line of rack 42 and, by receiving the ends of the pin 46, maintain the gear in engagement with the rack 42 while permitting the necessary lateral movement.

The operation of this version of the invention is essentially the same as for the above-described embodiments. Two fluid passages are provided, and the one having the higher pressure will cause the gear to rotate toward the chamber wall to cut down its cross sectional area. As before, therefore, the flow-dividing disc member is reacted upon directly by the fluid to balance the outlets immediately upon the presence of any unequal pressure conditions within the housing.

The design of FIGS. 7 and 8 is particularly adapted for use as a flow divider, and is not reversible to act as an equalizer as in the previously described embodiments.

As a further modification, this invention will also act to equalize flows when constructed with four openings to transmit fluid instead of three as in the previously described embodiments. Such a design, an example of which is illustrated in FIG. 9, may include the separate rack and gear as shown in FIGS. 1 through 3, or the gear may be incorporated in the disc element as in FIGS. 7 and 8.

According to the arrangement of FIG. 9, housing 51 includes a duality of spaced inlet openings 52 and 53 located opposite outlets 54 and 55. A flow dividing disc 56 separates the housing into a duality of separate passageways C and D between the inlets and the outlets. As illustrated, disc 56 is formed as a gear meshing with rack 57 on the chamber wall and is guided transversely of the housing by pin 58 sliding in slots in the cover plates.

Fluid admitted to the housing will engage the periphery of element 56 on two sides as it flows through passageways C and D toward the outlets. The passageway having a higher fluid pressure will cause the gear 56 to rotate so as to cut down its size and open up the other. Thus, the pressure balancing action takes place as before. The fluid conduits connected to the openings 52, 53, 54 and 55, therefore, will be given equal pressures as the member 56 positions itself to equalize the flows.

From the foregoing it can be seen, therefore, that I have provided an improved flow equalizing device by which fluid flow may be made equal either in inlet or outlet lines. It is very simply constructed and has essentially only one moving part. The fluid reaction is direct, resulting in instantaneous adjustment to equalized flows. Nevertheless, the unit is of extreme accuracy and will permit practically no variation in the flows in the various lines.

The foregoing detailed description is to be clearly understood as given by way of illustration and example only, the spirit and scope of this invention being limited solely by the appended claims.

I claim:

1. A flow controlling device comprising a housing having a symmetrical chamber therein, said chamber having an aperture at one end thereof, and a duality of spaced apertures at the opposite end thereof, said chamber having a straight side portion opposite said first-mentioned aperture and intermediate said duality of apertures, a substantially circular member in said chamber said member having an edge in juxtaposition with said straight side portion whereby said member divides said chamber into a duality of passageways between said first-mentioned aperture and said duality of apertures, said member being rotatable in response to fluid forces in said passageways, and means for causing said member to move laterally in response to such rotation to reduce the dimension of the passageway having a pressure higher than in the other, and to increase the dimension of such other passageway.

2. A fluid flow controlling device comprising a housing, said housing having a duality of openings at one end thereof and a single opening at the opposite end thereof; a rotatable member in said housing, said housing having a substantially straight wall opposite said single opening and intermediate said duality of openings, one side of said rotatable member being in juxtaposition with said substantially straight wall whereby said rotatable member divides the interior of said housing into two passageways between said single opening and said duality of openings, and means for guiding said rotatable member in a path for translational movement substantially parallel to said straight wall in said housing toward either of said passageways having a higher pressure than the other.

3. A device as recited in claim 2 in which said rotatable member includes outwardly projecting vanes extending into said passageways for contact with fluid passing therethrough.

4. A device as recited in claim 2 in which said means for guiding said movable member comprises at least one rack carried by said housing, and a gear carried by said rotatable member at the axis thereof meshing with said rack.

5. A device as recited in claim 4 in which said rack is positionable selectively on the side of said gear adjacent said duality of openings, and on the side of said gear adjacent said single opening.

6. A flow controlling device comprising a housing having a chamber therein, said housing having a duality of spaced openings at one end of said chamber and a single opening at the opposite end of said chamber, said single opening being arranged so that the projection of the axis thereof bisects said chamber, said duality of openings being disposed one on either side of such a projection; a rotatable disc member in said chamber, with one side of said disc being adjacent one of said duality of openings and the other side of said disc being adjacent the other of said duality of openings, said chamber having a substantially flat wall portion substantially opposite said single opening and disposed intermediate said duality of openings, one edge of said rotatable disc member being in juxtaposition with said substantially straight wall portion; a rack carried by said housing, the teeth of said rack defining a path substantially parallel to said substantially straight wall portion; and a gear integrally carried by said rotatable disc member at the axis thereof and meshingly engaging said rack.

7. A device as recited in claim 6 in which said housing includes a portion having a recess therein, said rack being received in said recess, said recess having a wall in spaced parallelism with the pitch line of said rack, said gear being received in said recess and being retained between said rack and said wall of said recess.

8. A device as recited in claim 7 in which said portion of said housing having said recess is selectively positionable with respect to the remainder of said housing in either of two positions 180° apart for thereby permitting said device selectively to act as a flow equalizer or flow divider.

9. A flow controlling device comprising a housing, said housing having a pair of spaced parallel walls interconnected by a side wall thereby to define a hollow chamber, said side wall having a first opening at one end thereof, and a duality of openings at the opposite end thereof, said duality of openings being spaced apart and located one on either side of a projection of said first opening through the center of said chamber, said side wall having a substantially straight portion intermediate said duality of openings; a disc member in said chamber, said disc member having radial walls in juxtaposition with said parallel walls of said housing, and having a circumferential edge portion in juxtaposition with said substantially straight portion of said side wall, said circumferential edge portion being adjacent one of said duality of openings on one side of said disc member and adjacent the other of said duality of said openings on the opposite side of said disc member; a pair of gears fixed one to each of said radial walls of said disc members and coaxial therewith; a pair of racks each of which meshes with one of said gears, said radial walls having recesses receiving said racks and said gears, each of said recesses positioning the rack therein along a line substantially parallel to said straight wall and including a straight edge portion substantially parallel to the rack therein and confining the gear therein to said meshing engagement with said rack.

10. A device as recited in claim 9 in which said parallel walls of said housing are removably secured to said side wall of said housing, and selectively positionable in a location to place said rack relatively adjacent said first opening and remote from said duality of openings, and in a location 180° reversed therefrom.

11. A flow controlling device comprising a housing having a chamber therein, said chamber having an aperture means at one end thereof, and a duality of spaced apertures at the opposite end thereof, a gear member in said chamber having an edge in juxtaposition with the wall of said chamber intermediate said duality of openings, said edge of said gear being adjacent one of said duality of apertures on one side of said gear and adjacent the other of said duality of apertures on the opposite side of said gear, and rack means for guiding said gear member for translational movement laterally of said chamber, so that in one direction of translational movement said gear moves toward one of said duality of openings and in the opposite direction of translational movement said gear moves toward the other of said duality of openings.

12. A flow controlling device comprising a housing having a symmetrical chamber therein, said chamber having an aperture means at one end thereof, and a duality of spaced apertures at the opposite end thereof, a rack in said chamber opposite said first-mentioned aperture means and intermediate said duality of apertures, a gear member received in said chamber in meshing engagement with said rack and dividing said chamber into a duality of passageways, said gear being rotatable by fluid forces in said chamber and having freedom for translational movement, said gear being movable toward the one of said duality of apertures having the greatest flow therethrough as compared with the other of said duality of apertures upon such rotation of said gear member.

13. A flow controlling device comprising a housing having a symmetrical chamber therein, said chamber having an aperture means at one end thereof, and a duality of spaced apertures at the opposite end thereof, a rack in said chamber opposite said first-mentioned aperture means and intermediate said duality of apertures, a gear member floatingly received in said chamber in meshing engagement with said rack and dividing said chamber into a duality of passageways, and means for maintaining said gear member in said meshing engagement while allowing translational movement of said gear parallel to said rack, said gear being translationally movable in a direction to constrict the one of said duality of passageways having greater fluid flow therein than the other of said duality of said passageways.

14. A device as recited in claim 13 in which said last mentioned means includes a pin projecting axially from said gear, said housing having a slot means parallel to said rack slidably receiving said pin.

15. A device as recited in claim 14 in which said pin projects beyond either radial face of said gear, said slot means including a duality of slots in opposed relationship on opposite sides of said housing.

16. A fluid flow controlling device comprising a housing, inlet means at one end of said housing, outlet means at the opposite end of said housing, a fluid-rotatable member in said housing between said ends dividing said housing into a duality of passageways therebetween with the periphery of said rotatable member being in communication with each of said passageways, said fluid-rotatable member being thereby engageable by the fluid in said housing in either of said duality of passageways, and means for guiding said rotatable member in a lateral path transversely of said passageways, said guide means including means for causing said fluid-rotatable member to so move toward either passageway having a higher fluid pressure therein than the other.

References Cited in the file of this patent

UNITED STATES PATENTS

| | | |
|---|---|---|
| 962,111 | Assmann | June 21, 1910 |
| 1,888,239 | Mosby | Nov. 22, 1932 |
| 1,905,733 | Moore | Apr. 25, 1933 |